United States Patent Office 2,994,612
Patented Aug. 1, 1961

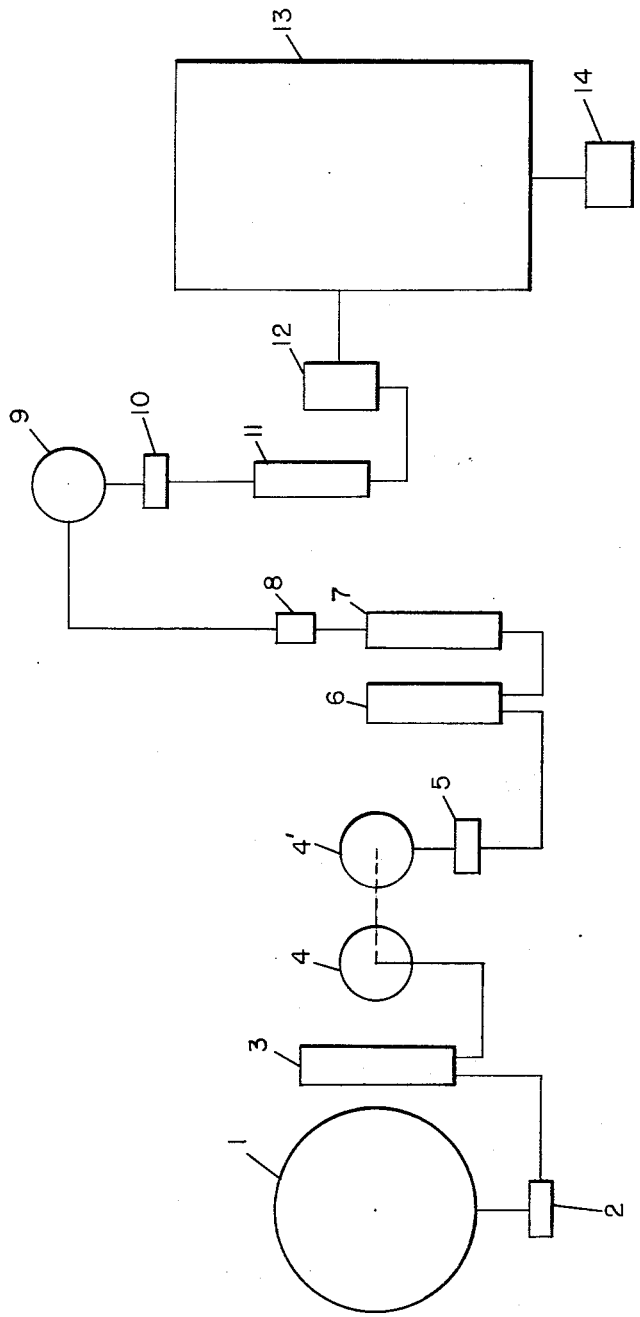

2,994,612
METHOD OF PREPARING INSTANT DRY MILK
Maurice A. Rice, Chippewa Falls, Wis., assignor to North Star Dairy, St. Paul, Minn., a co-operative association of Minnesota
Filed Aug. 31, 1956, Ser. No. 607,493
11 Claims. (Cl. 99—56)

This invention relates to instant dry milk and dry milk products.

An object of this invention is to provide a novel process for the manufacture of a dry milk product, which, when mixed with water, fluid milk or the like will readily be reconstituted into a fluid milk product, either with or without the butterfat removed therefrom.

Another object of the invention is to provide a method for the manufacture of a dry milk product, which, when reconstituted into a fluid milk product, has a flavor and consistency similar to that of fresh milk.

An additional object of the invention is to provide a method for producing dry milk solids having the same relative proportions of milk solids as existed in the fresh milk from which the milk solids are made.

A further object is to produce a dry milk product which will be readily dissolved upon the addition of water.

Another additional object of the invention is to provide a method for producing a dry milk product which has the various advantages herein described.

Additional objects and advantages of the invention will appear from the following description in which a preferred and practical embodiment has been set forth in conjunction with the accompanying drawing.

In the drawing: FIG. 1 is a flow diagram illustrating one procedure for practicing the invention.

In reconstituting a dry milk product with water, three factors are involved. These are:

(1) Wettability
(2) Dispersibility
(3) Solubility

First the particle of dried product must be wetted with the water. The particle must then be transported to the liquid phase, and finally dissolved and lose its identity as a particle. These steps are all very important.

In order to increase the rate of wetting, the particle must be of such size that the water may enter the mass of milk powder by capillary action. As the various particles become wetted they are drawn into the liquid phase. The larger the mass of the particle the more readily will it wet, but it will have a tendency to move to the bottom of the vessel and require a longer time to dissolve.

Accordingly, it is essential to have controlled particle size. It is desirable to have a particle of such size that it will wet with water but yet must be small enough in size so that it will remain suspended in the water without settling to the bottom.

Lactose in the crystalline state is not as readily soluble as lactose in the glass state. In conventional nonfat dry milk solids generally the lactose is in the glass state. By having the lactose in a form that is not readily soluble it is possible to get greater wetting of the powder particles with less interference to capillary rise of the water in between the powder particles.

To obtain large particles of dry milk it is necessary to form relatively large droplets during the atomization of the skim milk concentrate in the drying chamber. This is accomplished by reducing the spraying pressure, by increasing the orifice size of the spray nozzle and by increasing the viscosity of the concentrate. Viscosity of the concentrate may be increased by increasing the relative amount of the total solids, or by crystallizing the lactose.

The increase of total solids is not a practical method for increasing viscosity because with the increased solids there is a definite danger of rendering insoluble the proteins of milk, particularly the caseins. This is indicated by high insolubility index readings that are sometimes encountered. It has been found highly desirable to keep the concentrate between 40% and 45% total solids, which is below the concentration of total solids taught by the prior art for this product. When the concentration is above 45% total solids, difficulties with insolubility are encountered.

Procedures have previously been developed for the "seeding" of concentrated milk solids with lactose crystals to produce and expedite crystallization of the lactose contained in the concentrated milk solids. Prior procedures have further incorporated the use of spray drying practices for the production of powdered products. Such procedures have provided for a supersaturated concentration of the mlik lactose with relatively high concentrations of total solids. For example, in Sharp Patent No. 2,728,678 it is specified that skim milk is preferably concentrated to about 55% total solids, and whole milk from 50% to 52% total solids. Meade Patent No. 2,627,463 specifies concentrates of 45% to 60% solids.

As herein described I have found that the increase in the rate of viscosity of the concentration, but with a lower concentration of the total solids than that specified in the earlier art, is one of the features of my invention for the production of a powdered milk product which is superior in producing a more immediate and instant reconstitution of the powder into a milk product when added to water. I have also discovered a manner of "seeding" by which I maintain substantially the same relative proportions of milk solids as existed in the fresh milk from which the solids are made. Other features of my invention for the production of a larger powder particle and for superior taste qualities as hereinafter described also constitute substantial advances over the prior art.

I have discovered that it is possible to obtain the desired increased viscosity in the concentrate by crystallizing the lactose to form the hydrate state and yet not enter the danger zone of increased total solids concentration.

A principal objective of earlier discoveries has been the formation of a dried product in which the lactose has been crystallized for the purpose of stabilizing the product from caking due to moisture adsorption. One of the main objectives of the present invention is to make a product which will more readily reconstitute with water. This objective is accomplished by increasing particle size which is, in part, due to increasing the viscosity of the concentrate through crystallizing a portion of the lactose. The rate of wetting of the lactose is increased by crystallizing a portion of it. An improved product is also obtained by not increasing the total solids of the concentrate in excess of 45% total solids.

Data showing incrased viscosity produced by forced crystallization is illustrated by the following chart (where under commercial pratice the concentrate was aged between 13 and 14 hours before seeding):

| Total Solids, Percent | Viscosity Immediately After Manufacture | | Viscosity After Aging 13 to 14 Hours | | Viscosity 3 Hours After Seeding | |
|---|---|---|---|---|---|---|
| | 56° F. | 120° F. | 56° F. | 120° F. | 56° F. | 120° F. |
| 44.23 | 432 | 128 | 1,960 | 284 | 3,360 | 218 |
| 44.55 | 472 | 103 | 2,760 | 168 | 3,660 | 188 |
| 43.55 | 960 | 148 | 1,460 | 203 | 2,060 | 208 |
| 44.96 | 960 | 108 | 3,360 | 218 | 5,360 | 238 |

In the foregoing illustrations seeding of the concentrate was accomplished by adding 1½ gallons of concentrate from a previous operation to 1,000 pounds of concentrate in the vat. Viscosity readings in the foregoing chart were in centipoise.

The manufacture of nonfat dry milk pursuant to my method results in a finished product which has particles which, on the average, are of a much larger size than that of the conventional nonfat dry milk. Approximately 90% of the usual or conventional nonfat dry milk solids will pass through a sieve having openings 88 microns in size. Approximately 75% of the product manufactured by my process is retained on sieve of such size; thereby showing that my method of manufacture does influence particle size. As stated, I have found that particle size and state of the lactose is important in the reconstitution of milk powder.

Another desirable property in the finished product made pursuant to my invention is a distinct sweet flavor which, when the powder is reconstituted with water, has the flavor of the initial fresh milk. It is believed that the state of the lactose and my preferred temperature range of the outgoing drying air in the dryer are largely responsible for the desirable taste.

An example of my process, reference being made to FIG. 1, is as follows: Fluid skim milk flows from storage or holding tank 1 through milk pump 2 to heat exchanger 3 where it is preheated. The range of temperature and holding in such heat exchanger may be between about 161° F. for 16 seconds to 300° F. for 2 seconds. A temperature between said limits may be selected and a longer holding time may be employed if desired. I have found preheating for 15 minutes at 185° F. to be preferred. The effect of such preheating step is to denature a substantial portion of the whey proteins in the milk.

The fluid skim milk then flows to double or triple affect evaporators 4 and 4' where it is concentrated to a total solids content ranging between 40% and 45%. I have found that a total solids concentrate of 43% to 45% is the preferred range. The concentrate is then pumped by pump 5 on a continuous basis from the evaporators through a heat exchanger 6 where the concentrate is heated to approximately 165° F. After a holding period of approximately 20 seconds in heat exchanger 6 the concentrate is forwarded to heat exchanger 7 where it is cooled to between approximately 80° F. to 95° F., preferably about 95° F. The concentrate is then pumped by pump 8 into a relatively large agitator-equipped cooling vat 9 where slow continuous cooling is accomplished, until it reaches a preferred temperature of about 40° F. to 45° F. Agitation is carried out slowly as the concentrate is accumulated in the cooling vat. Such cooling of the concentrate aids in the development of the lactose crystals from the lactose solution which has become supersaturated in respect to lactose.

The concentrate may be examined from time to time under a microscope to determine the extent of lactose developed. When there is evidence of some large alpha lactose crystals approximately 1½ gallons of concentrate from a previous operation may be added to each 1,000 pounds of concentrate in the vat. The quantity of concentrate added may be reduced if the time for crystallization is lengthened, and if the crystallization process is accelerated the amount of concentrate added may be increased. After an operator has become familiar with the proper appearance and viscosity of the concentrate in the vat he may determine the time for addition of the concentrate from a previous operation by observation or by use of a viscosity meter, without use of a microscope. I have found in commercial operations that the concentrate may be held overnight in the cooling vat for 12 to 14 hours and the additional concentrate may be added the following morning. However, such additional concentrate may be added at any time after the appearance of large lactose crystals in the concentrate in the vat.

After the addition of the concentrate from a previous operation to the concentrate in the vat 9 the contents of the vat is agitated for about 2 to 3 hours. The mixture is pumped by pump 10 through heat exchanger 11 to raise the temperature of the mixture within the range of approximately 85° F. to 145° F. preferably between 115° F. and 125° F., as the mixture is forced through high pressure pump 12 into the spray-type milk dryer 13. I have found that if the temperature of the mixture is raised above 145° F. as it enters the dryer, the viscosity of the mixture decreases, and the resulting product is not as satisfactory as when kept within the range of 85° F. to 145° F. range. The drying is carried out at preferable pressures of approximately 1400 to 1600 pounds per square inch through pump 12 to the dryer nozzles (not shown) of dryer 13, though such pressures may range between 1,000 and 2,000 pounds per square inch. The orifices of the dryer nozzles may range from .047 inch to .067 inch in diameter.

The temperature of the incoming drying air in the dryer preferably ranges between approximately 320° F. and 330° F., though the temperature of the incoming air may be as high as 600° F. The temperature of the outgoing drying air in the dryer preferably ranges between approximately 204° F. and 210° F., though I have found about 206° F. particularly desirable.

The dried powder is then removed from the dryer to the powder cooler and sifter 14 to a temperature of less than 100° F. The moisture content of the finished product is held between 3% and 4% by weight. The substantial portion of the lactose in the finished product is in a crystalline state. It is believed that more crystalline beta lactose results from this procedure than is found in conventional instant type dry milk.

The concentrate from a previous operation which is added to the concentrate in the vat is prepared in the same manner as the concentrate in the vat. It has been my practice to withdraw a portion of the concentrate from the vat 9 about one hour after seeding, though it may be withdrawn sooner or later. The concentrate so withdrawn is then placed under refrigeration until added to the vat in a subsequent operation in the manner above described. During the period that such concentrate is under refrigeration the lactose becomes partially crystallized. I have found that storage of such concentrate for approximately 20 to 22 hours is satisfactory, after which it may be introduced into the concentrate in the vate as above described, though shorter or longer periods of storage will also prove satisfactory. If the lactose in the added concentrate of such previous operation has had little or no chance to crystallize, it will not produce as satisfactory crystallization after it is added to the vat of concentrate, as when permitted to crystallize before being added.

By use of concentrate from a previous operation where skim milk is used, the nonfat solids, such as, the lactose, milk proteins and minerals, are maintained in the same relative proportion as they were in the fresh milk from which made. The earlier art fails to show seeding with a concentrate consisting of all nonfat solids of milk, but such prior seeding has been with lactose crystals alone. Thus, by my invention I have made it possible to create a product by seeding of lactose crystals in skim milk which falls within the legal definition of nonfat dry milk or defatted milk which are are defined by federal law as "the product resulting from the removal of fat and water from milk, and contains the lactose, milk proteins, and milk minerals in the same relative proportions as in the fresh milk from which made. It contains not over 5 per centum by weight of moisture. The fat content is not over ½ per centum by weight unless otherwise indicated." Public Law 244, 78th Congress, Title 21 U.S.C. (Food & Drugs) §321c, as amended. The seeding with lactose crystals alone, as suggested by the earlier art, would not appear to maintain the relative proportions of lactose, milk proteins and milk minerals as is required by law for the product defined as nonfat dry milk or defatted milk. While the definition of "milk" or "milk solids" is not generally considered to include "skim milk" or "skim milk solids" it is my intention that for purposes of this application the term "milk" and "milk solids" as used herein and claimed includes "skim milk," and "skim milk solids," respectively, unless otherwise expressly stated.

A product having the desirable characteristics described hereinabove may also be obtained by the addition of commercial milk sugar or lactose rather than concentrate from a previous operation. I have found that when commercial milk sugar is added to the concentrate in the vat, approximately one pound of such commercial lactose sugar is adequate for each 1,000 pounds of of concentrate in the vat. The amount of milk sugar added may be varied somewhat depending upon the degree of crystallization of the concentrate in the vat. In all other respects the procedure is the same when using commercial milk sugar or lactose as I have described when concentrate from a previous operation is added to the concentrate in the vat.

It will be obvious from the foregoing to those skilled in the art that my invention is equally applicable to the production of dry milk solids containing fat, or of dried chocolate flavored drinks from milk products, as well as where specific solids of milk such as fat, casein, albumen, salts, etc. have been removed. It will be understood that the present invention is not confined to the precise methods and procedures nor the precise construction and arrangement of parts as herein illustrated and described, but employs all modifications thereof within the scope of the following claims.

I claim:

1. The method of producing an instant type of nonfat dry milk which is readily reconstituted into liquid form when mixed with water or fluid milk comprising, heating fluid skim milk to a temperature comparable to approximately 185° F. for 15 minutes whereby substantially to denature a substantial portion of the whey proteins in the milk, then evaporating such milk to produce a skim milk concentrate of between 40% and 45% total solids and cooling the same, adding to said concentrate other milk concentrate containing partially crystallized lactose, agitating said concentrate to produce a mixture of relatively high viscosity, introducing the said concentrate into a spray dryer having relatively large orifices at low pressure and at temperatures ranging between about 85° F. and 145° F., the temperature of the incoming drying air in said dryer ranging between approximately 320° F. and 600° F. and the temperature of the outgoing drying air ranging between approximately 204° F. and 210° F. to produce dried particles relatively large in size and cooling the dried product.

2. The method of producing dry milk which is readily reconstituted into liquid form when mixed with water or fluid milk which comprises, preheating fluid milk substantially to denature a substantial portion of the whey proteins therein, then evaporating such milk to produce a milk concentrate of between 40% and 45% total solids, cooling the same until large alpha lactose crystals appear therein, then adding other milk concentrate containing partially crystallized lactose, agitating said concentrate until a mixture of relatively high viscosity is produced, drying the mixed concentrate in a spray dryer to produce particles relatively large in size.

3. The method of producing an instant type of nonfat dry milk which is readily reconstituted into liquid form when mixed with water or fluid milk comprisng, preheatng fluid skim milk to a temperature comparable to approximately 185° F. for 15 minutes whereby substantially to denature a substantial portion of the whey proteins therein, then evaporating such milk to produce a skim milk concentrate of between 40% to 45% total solids, cooling the same until large alpha lactose crystals appear therein, then adding other milk concentrate containing partially crystallized lactose, agitating said concentrate until a mixture of relatively high viscosity is produced, drying the mixed concentrate in a spray dryer to produce particles relatively large in size.

4. The process of manufacturing an instant type milk powder wherein fluid milk is heated to a temperature sufficient substantially to denature a substantial portion of the whey proteins therein, then evaporating such milk to a concentrate ranging between 40% and 45% total solids, cooling and agitating said concentrate until relatively large alpha lactose crystals are developed therein, adding milk concentrate containing lactose partially crystallized from a previous similar operation in the proportions of approximately 1½ gallons of such additional concentrate for each 1,000 pounds of said original concentrate, followed by continued agitation of said mixture of the original concentrate and the additional concentrate for approximately 2 to 3 hours to produce a mixture of relatively high viscosity, drying said mixture with a spray dryer at relatively low pressure through spray dryer nozzles having relatively large orifices, the temperature of said concentrate when fed into said dryer ranging between approximately 85° F. and 145° F., the incoming drying air in said dryer ranging between approximately 320° F. and 600° F. and the outgoing drying air from said dryer ranging between about 204° F. and 210° F., to produce dried particles relatively large in size, and cooling said dried product.

5. The process of manufacturing an instant type of nonfat milk powder wherein fluid skim milk is heated to a temperature comparable to 185° F. for 15 minutes whereby substantially to denature a substantial portion of the whey proteins in the milk, then evaporating such milk to a concentrate ranging between 40% to 45% total solids, cooling and agitating said concentrate until relatively large alpha lactose crystals are developed therein, adding milk concentrate containing lactose partially crystallized from a previous similar operation in the proportions of approximately 1½ gallons of such additional concentrate for each 1,000 pounds of said original concentrate, followed by continued agitation of said mixture of the original concentrate and the additional concentrate for approximately 2 to 3 hours to produce a mixture of relatively high viscosity, drying said mixture with a spray dryer at relatively low pressure through spray dryer nozzles having relatively large orifices, the temperature of said concentrate when fed into said dryer ranging between approximately 85° F. and 145° F., the incoming drying air in said dryer ranging between approximately 320° F. and 600° F. and the outgoing drying air from said dryer ranging between about 204° F. and 210° F., to produce dried particles relatively large in size, and cooling said dried product.

6. The method of producing an instantly convertible type of dry milk solids comprising, preheating fluid milk substantially to denature a substantial portion of the whey proteins therein, then evaporating such milk to produce a milk concentrate of between 40% to 45% total solids, cooling the same until large alpha lactose crystals appear therein, then adding milk sugar, mixing said concentrate and milk sugar until a mixture of relatively high viscosity is produced, drying the mixed concentrate in a spray dryer to produce particles relatively large in size.

7. The method of producing an instantly convertible type of nonfat dry milk solids comprising, preheating fluid skim milk to a temperature comparable to approximately 185° F. for 15 minutes whereby substantially to denature a substantial portion of the whey proteins therein, then evaporating such milk to produce a milk concentrate of between 40% to 45% total solids, cooling the same until large alpha lactose crystals appear therein, then adding milk sugar, mixing said concentrate and milk sugar until a mixture of relatively high viscosity is produced, drying the mixed concentrate in a spray dryer to produce particles relatively large in size.

8. In the process of manufacturing powdered milk which when mixed with water or fluid milk will instantly be converted into a fluid milk product which comprises, heating fluid milk to a temperature sufficient substantially to denature a substantial portion of the whey proteins therein, then evaporating such milk to a concentrate ranging between 40% and 45% total solids, cooling and agitating said concentrate until relatively large alpha lactose crystals are developed therein, adding milk sugar in the proportions of approximately 1 pound of milk sugar for each 1,000 pounds of concentrate, followed by mixing said concentrate and milk sugar for approximately 2 to 3 hours to produce a mixture of relatively high viscosity, drying said mixture with a spray dryer at relatively low pressure through spray dryer nozzles having relatively large orifices, the temperature of said concentrate when fed into said dryer ranging between approximately 85° F. and 145° F., the incoming drying air in said dryer ranging between approximately 320° F. and 600° F., and the outgoing drying air from said dryer ranging between about 204° F. and 210° F. to produce dried particles relatively large in size and cooling dried powder.

9. In the process of manufacturing nonfat powdered milk which when mixed with water or fluid milk will instantly be converted into a fluid milk product which comprises, heating fluid skim milk to a temperature comparable to 185° F. for 15 minutes whereby substantially to denature a substantial portion of the whey proteins in the milk, then evaporating such milk to a concentrate ranging between 40% and 45% total solids, cooling and agitating said concentrate until relatively large alpha lactose crystals are developed therein, adding milk sugar in the proportions of approximately 1 pound of milk sugar for each 1,000 pounds of concentrate, followed by mixing said concentrate and milk sugar for approximately 2 to 3 hours to produce a mixture of relatively high viscosity, drying said mixture with a spray dryer at relatively low pressure through spray dryer nozzles having relatively large orifices, the temperature of said concentrate when fed into said dryer ranging between approximately 85° F. and 145° F., the incoming drying air in said dryer ranging between approximately 320° F. and 600° F., and the outgoing drying air from said dryer ranging between about 204° F. and 210° F. to produce dried particles relatively large in size and cooling said dried powder.

10. The method of producing an instantly convertible type of dry milk solids comprising, preheating fluid milk substantially to denature a substantial portion of the whey proteins therein, then evaporating such milk to produce a milk concentrate of between 40% to 45% total solids, cooling the same until large alpha lactose crystals appear therein, then adding other milk concentrate having lactose, milk proteins and milk minerals in the same relative proportions as in the fresh milk from which made, agitating said concentrates until a mixture of relatively high viscosity is produced, drying the mixed concentrate in a spray dryer to produce particles relatively large in size.

11. The method of producing an instantly convertible type of instant dry milk solids comprising, preheating skim fluid milk to a temperature comparable to approximately 185° F. for 15 minutes whereby substantially to denature a substantial portion of the whey proteins therein, then evaporating such milk to produce a milk concentrate of between 40% to 45% total solids, cooling the same until large alpha lactose crystals appear therein, then adding other milk concentrate having lactose, milk proteins and milk minerals in the same relative proportions as in the fresh milk from which made, agitating said concentrates until a mixture of relatively high viscosity is produced, drying the mixed concentrate in a spray dryer to produce particles relatively large in size.

References Cited in the file of this patent

UNITED STATES PATENTS

| | | |
|---|---|---|
| 2,088,606 | Peebles et al. | Aug. 3, 1937 |
| 2,627,463 | Meade | Feb. 3, 1953 |
| 2,728,678 | Sharp | Dec. 27, 1955 |

UNITED STATES PATENT OFFICE
CERTIFICATE OF CORRECTION

Patent No. 2,994,612                      August 1, 1961

Maurice A. Rice

It is hereby certified that error appears in the above numbered patent requiring correction and that the said Letters Patent should read as corrected below.

Column 2, line 19, for "mlik" read -- milk --; line 55, for "incrased" read -- increased --; column 4, line 64, strike out "are", second occurrence; line 70, for "½" read -- 1½ --; column 5, line 70, for "heatng" read -- heating --; column 6, line 35, for "to", second occurrence, read -- and --.

Signed and sealed this 12th day of December 1961.

(SEAL)
Attest:

ERNEST W. SWIDER
Attesting Officer

DAVID L. LADD
Commissioner of Patents